(12) United States Patent
Lee

(10) Patent No.: US 7,483,321 B2
(45) Date of Patent: Jan. 27, 2009

(54) SEMICONDUCTOR MEMORY DEVICE CAPABLE OF CHECKING A REDUNDANCY CODE AND MEMORY SYSTEM AND COMPUTER SYSTEM HAVING THE SAME

(75) Inventor: Kee-Hoon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 250 days.

(21) Appl. No.: 11/407,028

(22) Filed: Apr. 20, 2006

(65) Prior Publication Data

US 2006/0282578 A1   Dec. 14, 2006

(30) Foreign Application Priority Data

May 27, 2005   (KR) ...................... 10-2005-0045059

(51) Int. Cl.
*G11C 7/00* (2006.01)

(52) U.S. Cl. ....................................... 365/201; 365/200

(58) Field of Classification Search ................. 365/201, 365/230.03, 230.08, 200; 711/113; 710/52, 710/39; 714/42
See application file for complete search history.

(56) References Cited

U.S. PATENT DOCUMENTS

| | | | |
|---|---|---|---|
| 5,028,922 A * | 7/1991 | Huang | 341/59 |
| 6,137,745 A | 10/2000 | Lin et al. | |
| 6,321,361 B1 * | 11/2001 | Autechaud et al. | 714/807 |
| 6,754,117 B2 | 6/2004 | Jeddeloh | |
| 6,820,181 B2 | 11/2004 | Jeddeloh | |
| 6,996,749 B1 * | 2/2006 | Bains et al. | 714/42 |
| 2004/0246767 A1 | 12/2004 | Vogt | |
| 2006/0047899 A1 * | 3/2006 | Ilda et al. | 711/113 |

FOREIGN PATENT DOCUMENTS

| JP | 2003-256232 | 9/2003 |
|---|---|---|
| KR | 1020020066946 | 8/2002 |

OTHER PUBLICATIONS

Korean Office Action dated May 26, 2006.

* cited by examiner

*Primary Examiner*—Gene N. Auduong
(74) *Attorney, Agent, or Firm*—Harness, Dickey & Pierce, P.L.C.

(57) ABSTRACT

Semiconductor memory devices include a memory cell array, a deserializer, a decoder, a redundancy code checker, a control circuit, a redundancy code generator and a serializer. The deserializer generates a deserialized data by deserializing a first serialized data. The decoder generates a first data, a command signal, an address signal and a first redundancy code by decoding the deserialized data. The redundancy code checker generates a status signal by comparing the first data with the first redundancy code and detects an error in the first data. The control circuit stores the first data in the memory cell array or outputs a second data stored in the memory cell array in response to the command signal and the address signal. The redundancy code generator generates a second redundancy code by using the second data. The serializer generates a second serialized data by serializing the second data and the second redundancy code.

19 Claims, 5 Drawing Sheets

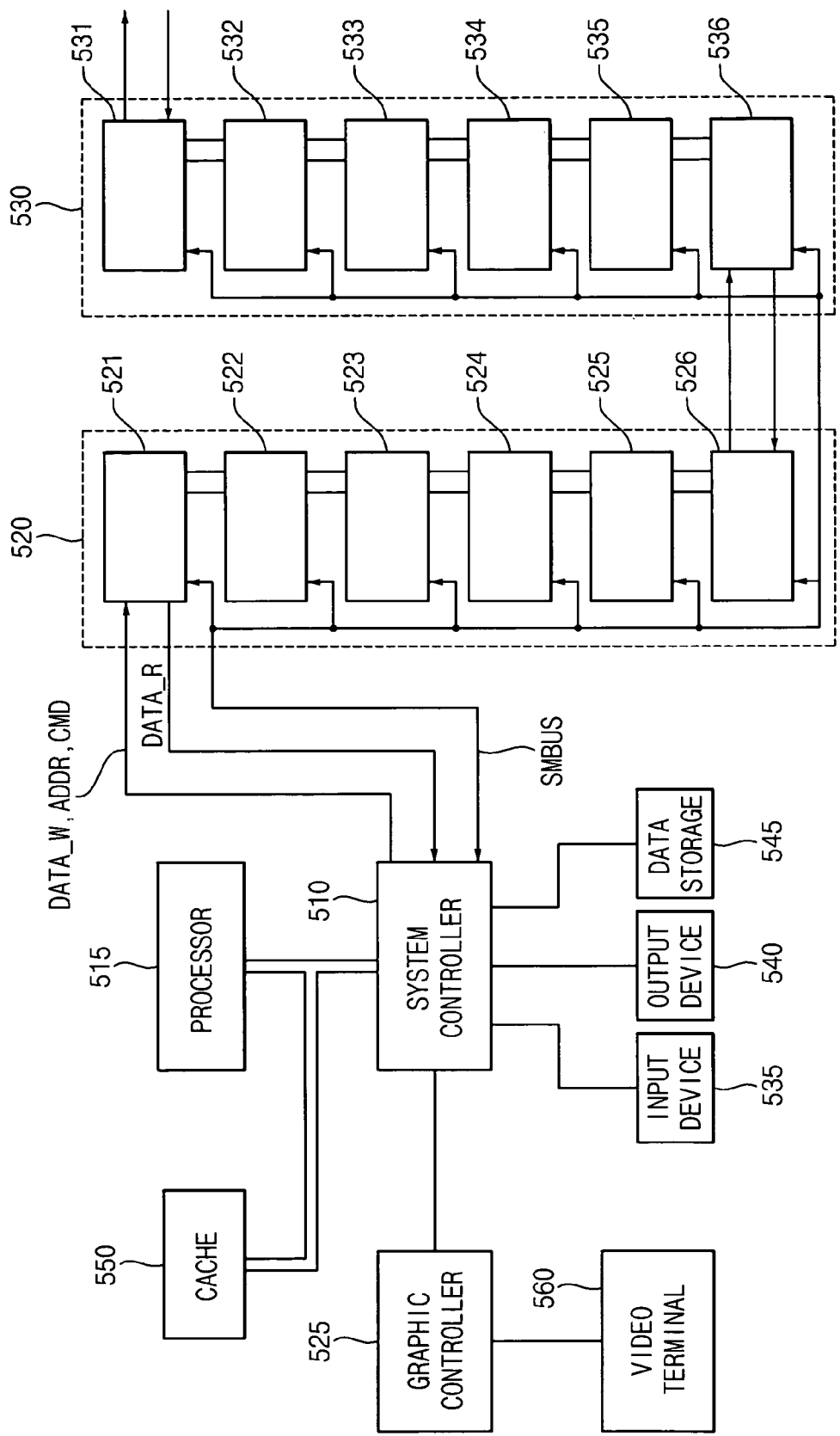

SEMICONDUCTOR MEMORY DEVICE CAPABLE OF CHECKING A REDUNDANCY CODE AND MEMORY SYSTEM AND COMPUTER SYSTEM HAVING THE SAME

PRIORITY STATEMENT

This application claims the benefit under 35 U.S.C. § 119(a) of Korean Patent Application No. 2005-45059 filed on May 27, 2005, the entire contents of which are herein incorporated by reference.

BACKGROUND OF THE INVENTION

1. Field of the Invention

Example embodiments of the present invention relate to a semiconductor memory device and a memory system, and more particularly to a semiconductor memory device having a redundancy code checking function and a memory system having the same.

2. Description of the Related Art

As application systems become more developed, a transfer rate and a throughput of data between a host, for example, a memory controller, and a semiconductor memory device is increasing. At least in part due to the increase of the transfer rate and the throughput of data, signal integrity for transferred data is becoming more important. In a high-speed communication, the number of dual in-line memory modules (DIMM) per channel may be restricted. Conventionally, to deal with the restriction, a fully buffered dual in-line memory module (FBDIMM) has been used. In the FBDIMM, a buffer referred to as a hub, may be placed between the semiconductor memory device and a host.

FIG. 1 is a block diagram illustrating a prior art computer system including memory hubs included in memory modules.

Referring to FIG. 1, a computer system 100 may include a processor 104, a system controller 110, a cache memory 108, a graphic controller 112, a video terminal 114, an input device 118, an output device 120, a data storage device 124, and memory modules 130a, 130b, . . . , 130n.

The system controller 110 may function as a path through which the above devices 112, 114, 118, 120 and 124 communicate with the processor 104. The system controller 110 may include a memory hub controller (not shown) coupled with the memory modules 130a, 130b, . . . , 130n. The memory modules 130a, 130b, . . . , 130n may function as a system memory for the computer system 100. The memory modules 130a, 130b, . . . , 130n may be coupled with the memory hub controller through a common link 134. Each of the memory modules 130a, 130b, . . . , 130n may include a memory hub 140 for controlling access to, for example, six corresponding memory devices 148. Each memory device 148 may be a synchronous dynamic random access memory (SDRAM). Memory hub 140 may be coupled with memory devices 148 through a bus system including a control bus, an address bus and a data bus, for example.

Even in a FBDIMM memory system, however, transfer errors may occur between semiconductor memory devices during data transfer processes.

SUMMARY OF THE INVENTION

An example embodiment of the present invention provides a semiconductor memory device capable of checking transfer errors that may occur between semiconductor memory devices during data transfer processes.

An example embodiment of the present invention provides a semiconductor memory device capable of functioning as a hub of a fully buffered dual in-line memory module (FB-DIMM).

An example embodiment of the present invention provides a memory system that includes a semiconductor memory device capable of checking transfer errors that may occur between semiconductor memory devices during data transfer processes.

An example embodiment of the present invention provides a computer system that includes a semiconductor memory device capable of checking transfer errors that may occur between semiconductor memory devices during data transfer processes.

An example embodiment of the present invention provides a method of checking transfer errors that may occur between semiconductor memory devices during data transfer processes.

An example embodiment of the present invention provides a semiconductor memory device. The semiconductor memory device may include a memory cell array, a deserializer, a decoder, a redundancy code checker, a control circuit, a redundancy code generator and a serializer. The deserializer may generate a deserialized data by deserializing a first serialized data, where the first serialized data is received from an external source. The decoder may generate a first data, a command signal, an address signal and/or a first redundancy code by decoding the deserialized data. The redundancy code checker may generate a status signal by comparing the first data with the first redundancy code to detect an error in the first data. The control circuit may store the first data in the memory cell array, and/or output a second data stored in the memory cell array in response to the command signal and the address signal. The redundancy code generator may generate a second redundancy code by using the second data. The serializer may generate a second serialized data by serializing the second data and the second redundancy code.

A semiconductor memory device according to an example embodiment of the present invention may also include a status register for storing the status signal received from the redundancy code checker.

A semiconductor device according to an example embodiment of the present invention may also include a write buffer for buffering the first serialized data received from a write input line, and for outputting the buffered first serialized data to the deserializer and to a write output line.

A semiconductor memory device according to an example embodiment of the present invention may also include a read buffer for buffering a second serialized data received from the serializer and a third serialized data received from a read input line to output the buffered data to a read output line.

An example embodiment of the present invention provides a memory system. The memory system may include a memory controller and a plurality of semiconductor memory devices. The semiconductor memory devices are coupled with the memory controller. Each of the semiconductor memory devices may be coupled with each other through a daisy chain, and may be configured to generate and check a redundancy code.

An example embodiment of the present invention provides a computer system. The computer system may include a central processing unit (CPU), a system controller coupled with the CPU and having an input port and an output port, an input device coupled with the CPU through the system controller, an output device coupled with the CPU through the system controller, a data storage device coupled with the CPU through the system controller, and a plurality of semiconductor memory devices coupled with the system controller. Each of the semiconductor memory devices may be coupled with each other through a daisy chain, and may be configured to generate and check a redundancy code.

An example embodiment of the present invention provides a method of detecting an error of a memory system. The memory system may include a memory controller and semiconductor devices coupled with the memory controller. The method of detecting an error of a memory system may include generating a deserialized data by deserializing a first serialized data in the respective semiconductor memory devices, the first serialized data being received to the respective semiconductor memory devices from an external source; generating a first data, a command signal, an address signal and a first redundancy code by decoding the deserialized data; generating a status signal by comparing the first data with the first redundancy code so as to detect an error in the first data; and detecting a malfunctioning channel by checking the status signal at the memory controller.

BRIEF DESCRIPTION OF THE DRAWINGS

The above and other features and advantages of the present invention will become more apparent by describing in detail example embodiments of the present invention with reference to the accompanying figures, in which:

FIG. 5 is a block diagram illustrating a computer system including a plurality of the semiconductor memory devices in accordance with an example embodiment of the present invention as shown in FIG. 2.

DESCRIPTION OF EXAMPLE EMBODIMENTS OF THE PRESENT INVENTION

Figure 1:
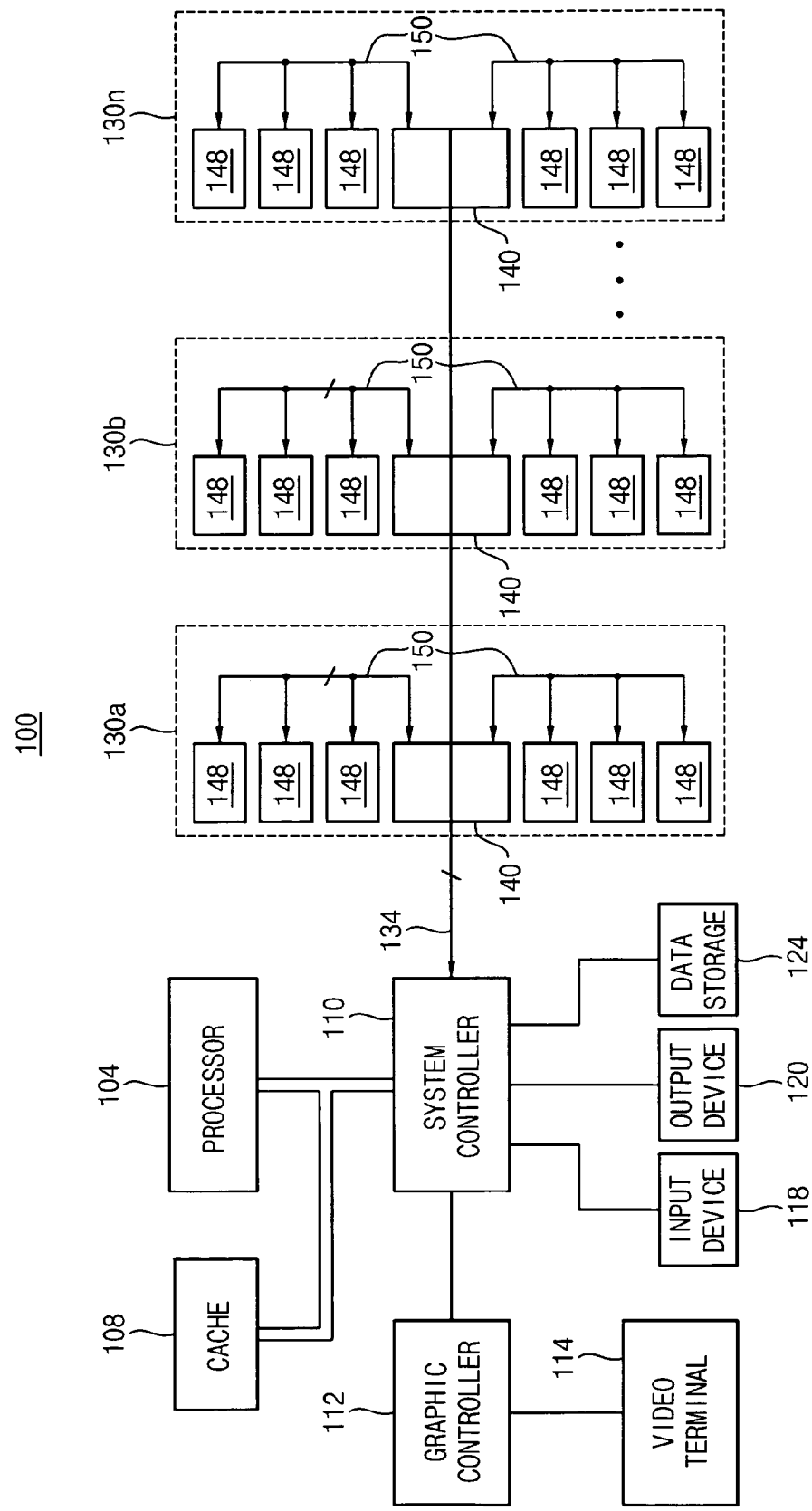
FIG. 1 is a block diagram illustrating a prior art computer system including memory hubs included in memory modules.

The invention is described more fully hereinafter with reference to the accompanying drawings, in which example embodiments of the present invention are shown. This invention may, however, be embodied in many different forms and should not be construed as limited to the example embodiments of the present invention as set forth herein. Rather, these example embodiments of the present invention are provided so that this disclosure will be thorough and complete, and will fully convey the scope of the invention to those skilled in the art. In the figures, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 2:
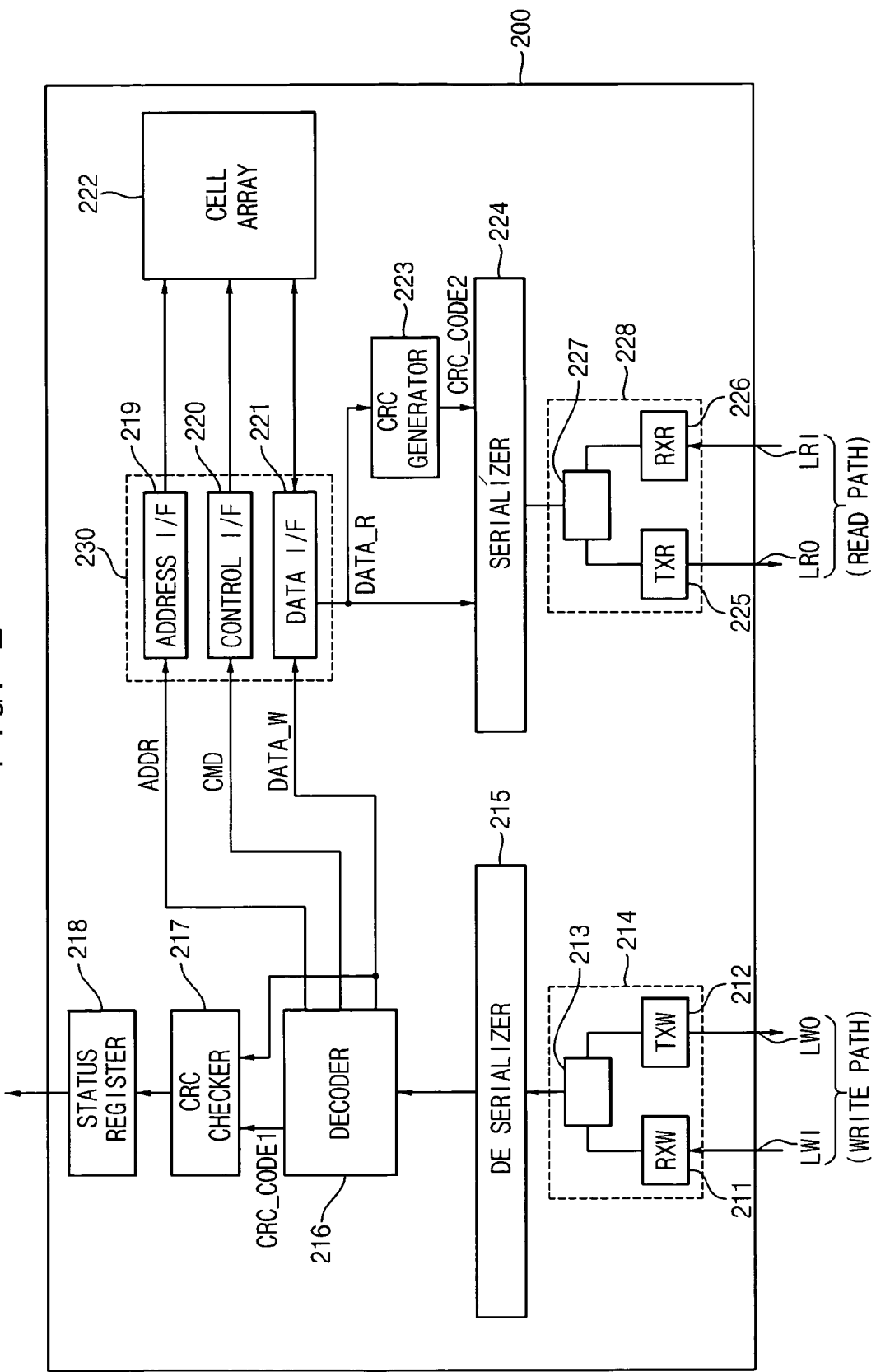
FIG. 2 is a block diagram illustrating a semiconductor memory device configured to generate and check a redundancy code according to an example embodiment of the present invention.

FIG. 2 is a block diagram illustrating a semiconductor memory device configured to generate and check a redundancy code according to an example embodiment of the present invention.

Referring to FIG. 2, a semiconductor memory device 200 may include a memory cell array 222, a deserializer 215, a decoder 216, a cyclic redundancy code (CRC) checker 217, a status register 218, a control circuit 230, a CRC generator 223, and a serializer 224. A control circuit 230 may include an address interface 219, a control interface 220 and a data interface 221. Further, a memory device 200 may include a write buffer 214 and read buffer 228. A write buffer 214 may include a reception write buffer 211, a coupling circuit 213 and a transmission write buffer 212. A read buffer 208 may include a reception read buffer 226, a coupling circuit 227 and transmission read buffer 225.

A reception write buffer 211 may buffer first serialized data received through a write input line LWI. A coupling circuit 213 may output an output signal of the reception write buffer 211, to a deserializer 215 and a transmission write buffer 212. A transmission write buffer may buffer an output signal of a coupling circuit 213 to provide a buffered signal to a write output line LWO.

A deserializer 215 may receive an output signal of a write buffer 214 and may deserialize a received signal to generate deserialized data. A decoder 216 may receive the deserialized data from deserializer 215 and may decode the deserialized data to output first data DATA_W, command signal CMD, address signal ADDR and a first redundancy code CRC_CODE1. A CRC checker 217 may detect an error in the first data DATA_W by comparing the first data DATA_W with a first redundancy code CRC_CODE1 and may output a status signal. The status signal may include information of a status of input/output channels between a semiconductor device and a neighboring semiconductor memory device. A status register 218 may store a status signal received from the CRC checker 217. A control circuit 230, in response to a command signal CMD and/or an address signal ADDR, may store the first data DATA_W in memory cell array 222 and/or may output second data DATA_R that may be stored in memory cell array 222.

A CRC generator 223 may use the second data DATA_R to generate a second redundancy code CRC_CODE2. A serializer 224 may serialize the second data DATA_R and the second redundancy code CRC_CODE2 to generate a second serialized signal. A reception read buffer 226 may buffer third serialized data that may be received from a read input line LRI. A coupling circuit 227 may couple an output signal of the reception read buffer 226 and an output signal of the serializer 224 to provide a coupled signal to a transmission read buffer 225. The transmission read buffer 225 may buffer an output signal of coupling circuit 227 to provide a buffered signal to a read output line LRO.

Operation of a semiconductor memory device according to an example embodiment of the present invention as shown in FIG. 2 will now be described.

According to an example embodiment of the present invention, if a memory system including a memory controller and a plurality of semiconductor memory devices is operating in a write mode, first serialized data from a neighboring semiconductor memory device is input to the semiconductor memory device 200 through the write input line LWI. The first serialized data may include write data, an address signal and/or a command signal. The first serialized data may be buffered by the write buffer 214 and/or converted into deserialized data by deserializer 215. Deserialized data may be decoded by decoder 216, and first data DATA_W, command signal CMD, address signal ADDR and/or first redundancy code CRC_CODE1 may be output. A CRC checker 217 may detect an error in the first data DATA_W by comparing the first data DATA_W with a first redundancy code CRC_CODE1 and may output a status signal. A status register 218 may store the status signal received from CRC checker 217. A memory controller (not shown) may check the status signal stored in status register 218 and may detect malfunctioning input/output lines.

According to an example embodiment of the present invention, if a memory system including a memory controller and a plurality of semiconductor memory devices operates in a read mode, second data DATA_R stored in the memory cell array 222 may be output through the control circuit 230. A CRC generator 223 may use the second data DATA_R to generate a second redundancy code CRC_CODE2. The second data DATA_R and second redundancy code CRC_CODE2 may be serialized by a serializer 224 and converted into a second serialized signal. The second serialized data may be buffered by a read buffer 228 and output through the read output line LRO.

According to an example embodiment of the present invention, if a memory system operates in a read mode, the read buffer 228 may output second serialized data received from serializer 224, and may output, through read output line LRO, third serialized data that may be received from a neighboring semiconductor memory device through a read input line LRI.

A semiconductor memory device generating third serialized data may be located farther from a memory controller (not shown) than semiconductor memory device 200 according to an example embodiment of the present invention. A semiconductor memory device generating first serialized data may be located nearer to a memory controller (not shown) than semiconductor memory device 200 according to an example embodiment of the present invention.

Figure 3:
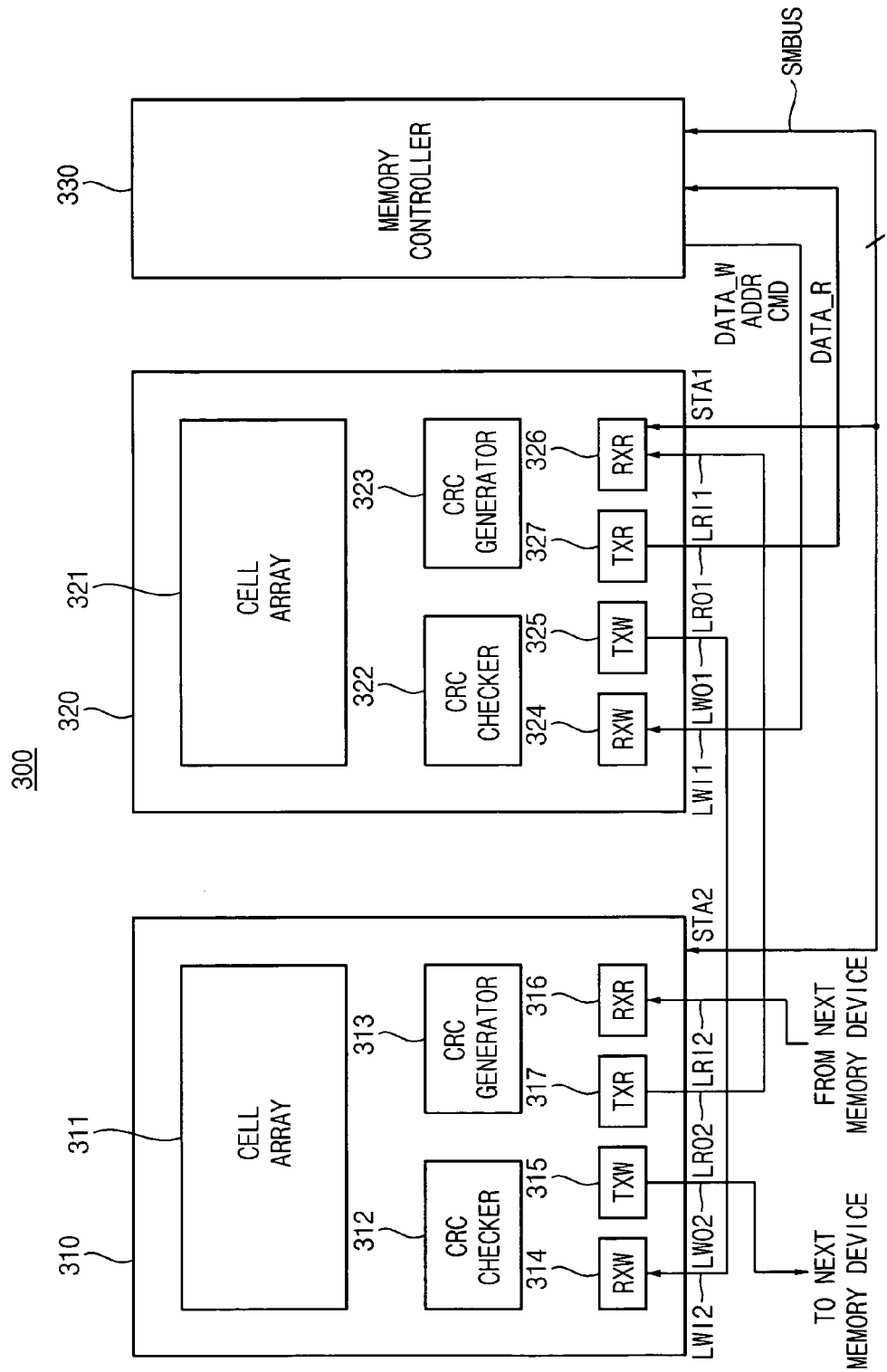
FIG. 3 is a block diagram illustrating a signal transfer between semiconductor memory devices included in a memory system according to an example embodiment of the present invention.

FIG. 3 is a block diagram illustrating a signal transfer between semiconductor memory devices according to an example embodiment of the present invention as shown in FIG. 2. Referring to FIG. 3, a memory system according to an example embodiment of the present invention is shown including a plurality of semiconductor memory devices. The interior components and interconnections of the semiconductor memory devices 310 and 320 are not illustrated in FIG. 3 to avoid unnecessarily complicating the figures. However, semiconductor memory devices 310 and 320 may be similar and/or identical to the semiconductor memory device illustrated in FIG. 2.

Referring to FIG. 3, the memory system 300 may include a memory controller 330, a first semiconductor memory device 320 and a second semiconductor memory device 310. The first semiconductor memory device may include a memory cell array 321, a CRC checker 322, a CRC generator 323, a reception write buffer 324, a transmission write buffer 325, a reception read buffer 326 and a transmission read buffer 327. A second semiconductor memory device may include a memory cell array 311, a CRC checker 312, a CRC generator 313, a reception write buffer 314, a transmission write buffer 315, a reception read buffer 316 and a transmission read buffer 317.

Operations of the memory system 300 according to an example embodiment of the present invention as shown in FIG. 3, is described below.

According to an example embodiment of the present invention, if the memory system 300 is operating in a write mode, the semiconductor memory device 320 may receive serialized data including write data DATA_W, an address signal ADDR and/or a command signal CMD from a memory controller 330 through a write input line LWI1. The serialized data may be buffered in the reception write buffer 324, deserialized by a deserializer (not shown), and substantially simultaneously provided to semiconductor memory device 310 through a write output line LWO1. The semiconductor memory device 310 may receive serialized data including the write data DATA_W, address signal ADDR and/or command signal CMD from semiconductor memory device 320 through a write input line LWI2. The serialized data may be buffered in the reception write buffer 314, deserialized by a deserializer (not shown), and substantially simultaneously provided to a neighboring semiconductor memory device through a write output line LWO2.

According to an example embodiment of the present invention, if the memory system 300 is operating in a read mode, the semiconductor memory device 310 may receive serialized data including a redundancy code and read data DATA_R from a neighboring semiconductor memory device through a read input line LRI2. The serialized data may be buffered in reception read buffer 316 and transmission read buffer 317, and may be provided to semiconductor memory device 320 through a read output line LRO2. Substantially, simultaneously, serialized data generated at semiconductor memory device 310 may be buffered in transmission read buffer 317, and provided to semiconductor memory device 320 through read output line LRO2.

According to an example embodiment of the present invention, the semiconductor memory device 320 may receive the serialized data including the redundancy code and/or the read data DATA_R from the semiconductor memory device 310 through a read input line LRI1. The serialized data may be buffered in reception read buffer 326 and transmission read buffer 327, and may be provided to memory controller 330 through a read output line LRO1. Substantially, simultaneously, the serialized data generated at the semiconductor memory device 320 may be buffered in transmission read buffer 326, and provided to memory controller 330 through read output line LRO1.

Further, the memory controller may detect a channel error by checking a status signals STA1 and STA2, respectively, received from the semiconductor memory devices 320 and 310.

Figure 4:
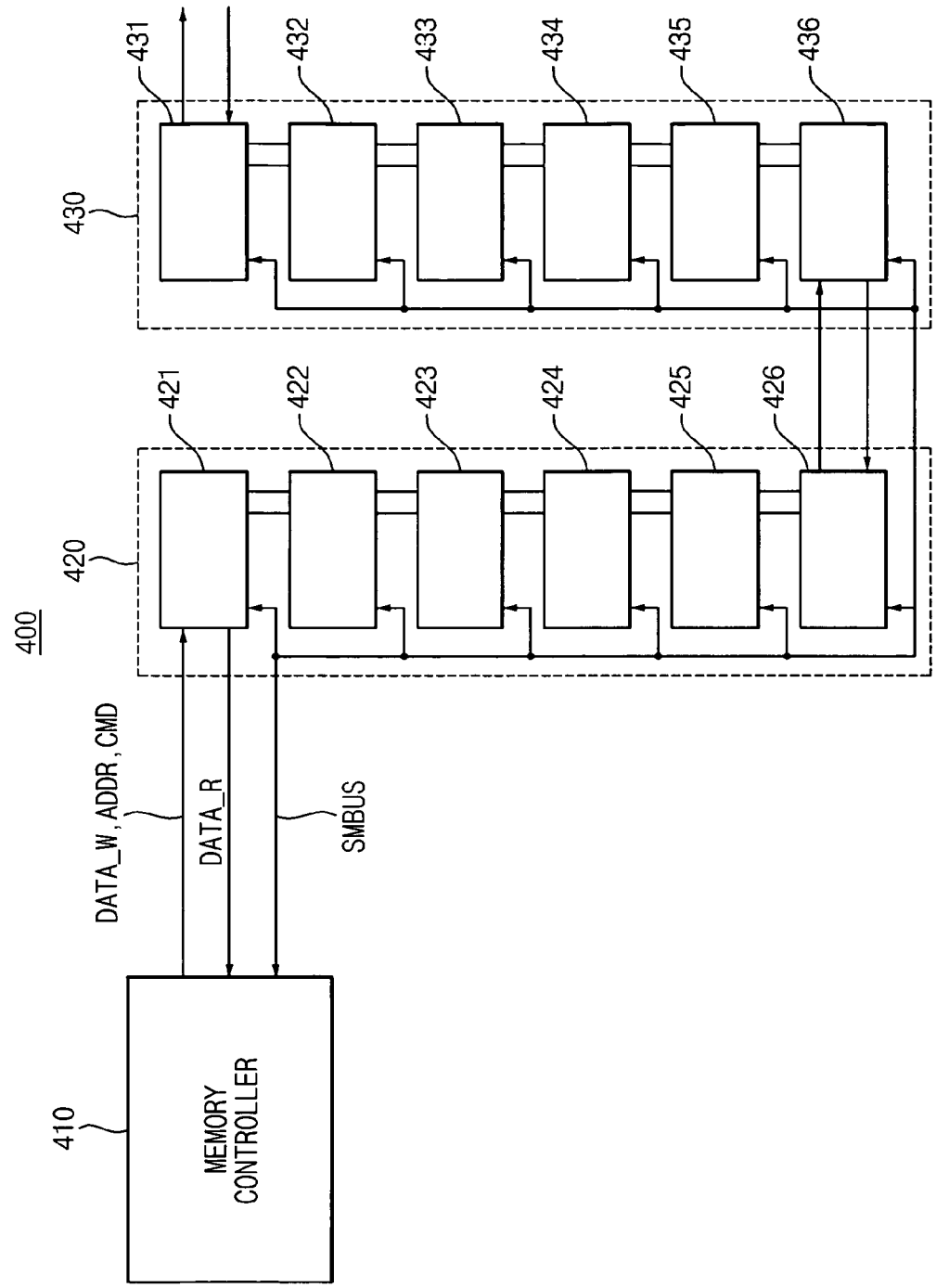
FIG. 4 is a block diagram illustrating a memory system including a plurality of semiconductor memory devices in accordance with an example embodiment of the present invention.

FIG. 4 is a block diagram illustrating a memory system, according to an example embodiment of the present invention, which may include a plurality of semiconductor memory devices of an example embodiment of the present invention as shown in FIG. 2.

Referring to FIG. 4, a memory system 400 may include a memory controller 410 and memory modules 420 and 430. Memory module 420 may include semiconductor memory devices 421 through 426, and memory module 430 may include semiconductor memory devices 431 through 436. A memory system according to an example embodiment of the present invention includes at least one memory module. In an example embodiment of the present invention illustrated in FIG. 4, a memory system includes two memory modules.

Operations of a memory system 400 according to an example embodiment of the present invention as shown in FIG. 4, is described below.

Memory controller 410 may be coupled with memory modules 420 and 430 that may function as a system memory of memory system 400. The memory controller 410 may be coupled with semiconductor memory device 421 included in the memory module 420 through a write bus and first data DATA_W, an address signal ADDR and/or a command signal CMD may be provided to the semiconductor memory devices 421 through 426 and/or 431 through 436, respectively. Additionally, the memory controller 410 may receive second data DATA_R through a read bus, from the semiconductor memory devices 421 through 426 and/or 431 through 436. The first data DATA_W may refer to write data and the second data DATA_R may refer to read data. The memory controller 410 may receive a status signal through a system management bus (SMBUS), from semiconductor memory devices 421 through 426 and 431 through 436, and may detect a malfunctioning channel by checking the status signal.

FIG. 5 is a block diagram illustrating a computer system according to an example embodiment of the present invention, which may include a plurality of the semiconductor memory devices according to an example embodiment of the present invention as shown in FIG. 2.

Referring to FIG. 5, a computer system 500 may includes a processor 515, a system controller 510, cache memory 550, graphic controller 525, video terminal 560, input device 535, output device 540, data storage device 545, and memory modules 520 and 530. A computer system 500 according to an example embodiment of the present invention includes at least one memory module. An example embodiment of the present invention illustrated in FIG. 5 includes two memory modules.

A processor 515 may perform various computations as a central processing unit (CPU), and may be coupled with a cache memory 550 through a processor bus. A video terminal 560 may be coupled with graphic controller 525.

System controller 510 may function as a path through which other devices may communicate with processor 515. For example, a system controller 510 may be coupled with a graphic controller 525 and a video terminal 530 may be coupled with the graphic controller 525. In addition, the system controller 510 may be coupled with an input device 535, for example, a keyboard, a mouse, etc., with an output device 540, for example, a printer, etc., and/or with a data storage device 545, for example, a hard disk drive, a floppy disk drive, etc.

Furthermore, the system controller 510 may be coupled with memory modules 520 and 530 functioning as a system memory for the computer system 500. The system controller 510 may be coupled with a semiconductor memory device 521 included in the memory module 520 through a write bus, and first data DATA_W, an address signal ADDR and a command signal CMD may be provided to semiconductor memory devices 521 through 526 and/or 531 through 536. Additionally, the system controller 510 may receive second data DATA_R through a read bus, from the semiconductor memory devices 521 through 526 and/or 531 through 536. First data DATA_W may refer to write data and second data DATA_R may refer to read data. The system controller 510 may receive a status signal through a system management bus (SMBUS), from the semiconductor memory devices 521 through 526 and/or 531 through 536, and may detect a malfunctioning channel by checking the status signal.

As described above, semiconductor memory devices and memory systems including the same according to example embodiments of the present invention may check transfer errors that may occur between semiconductor memory devices during data transfer processes. In addition, the semiconductor memory devices and memory systems including the same, according to example embodiments of the present invention, may perform the same and/or similar function as an FBDIMM hub in a conventional memory system. Furthermore, memory systems according to example embodiments of the present invention may have improved signal integrity compared with a conventional memory system.

The foregoing is illustrative of the present invention and is not to be construed as limiting thereof. Although a few example embodiments of this invention have been described, those skilled in the art will readily appreciate that many modifications may be possible in the example embodiments without materially departing from the novel teachings and advantages of this invention. Accordingly, all such modifications are intended to be included within the scope of this invention as defined in the claims.

What is claimed is:

1. A semiconductor memory device comprising:
   a memory cell array;
   a deserializer configured to generate a deserialized data by deserializing a first serialized data;
   a decoder configured to generate a first data, a command signal, an address signal and a first redundancy code by decoding the deserialized data;
   a redundancy code checker configured to generate a status signal by comparing the first data with the first redundancy code to detect an error in the first data;
   a control circuit configured to store the first data in the memory cell array or output a second data stored in the memory cell array in response to the command signal and the address signal;

a redundancy code generator configured to generate a second redundancy code by using the second data; and
a serializer configured to generate a second serialized data by serializing the second data and the second redundancy code.

2. The semiconductor memory device of claim 1, further comprising a status register configured to store the status signal received from the redundancy code checker.

3. The semiconductor memory device of claim 1, further comprising a write buffer configured to buffer the first serialized data received from a write input line, and configured to output the buffered first serialized data to the deserializer and to a write output line.

4. The semiconductor memory device of claim 3, wherein the write buffer comprises:
a reception write buffer configured to buffer the received first serialized data;
a coupling circuit configured to output an output signal of the reception write buffer to the deserializer and to a first line; and
a transmission write buffer configured to buffer a signal received through the first line to provide the buffered signal to the write output line.

5. The semiconductor memory device of claim 1, further comprising a read buffer configured to buffer the second serialized data received from the serializer and a third serialized data received from a read input line to output the buffered data to a read output line.

6. The semiconductor memory device of claim 5, wherein the read buffer comprises:
a reception read buffer configured to buffer the received third serialized data;
a coupling circuit configured to couple an output signal of the reception read buffer and an output signal of the serializer to output the coupled signal to a first line; and
a transmission read buffer configured to buffer a signal received through the first line to output the buffered signal to a read output line.

7. The semiconductor memory device of claim 1, wherein a memory controller of a memory system including the semiconductor memory device checks the status signal and determines a status of an input/output channel of the semiconductor memory device.

8. The semiconductor memory device of claim 1, wherein the status signal includes information of a status of input/output channels between the semiconductor memory device and a neighboring semiconductor memory device.

9. The semiconductor memory device of claim 1, wherein the semiconductor memory device receives the first serialized data in a write operation mode, and outputs the second serialized data in a read operation mode.

10. A memory system comprising:
a memory controller; and
a plurality of semiconductor memory devices coupled with the memory controller, wherein each of the semiconductor memory devices is coupled with each other through a daisy chain, and is configured to generate and check a redundancy code.

11. The memory system of claim 10, wherein each of the semiconductor memory devices comprises:
a memory cell array;
a deserializer configured to generate a deserialized data by deserializing a first serialized data;
a decoder configured to generate a first data, a command signal, an address signal and a first redundancy code by decoding the deserialized data;
a redundancy code checker configured to generate a status signal by comparing the first data with the first redundancy code to detect an error in the first data;
a control circuit configured to store the first data in the memory cell array or output a second data stored in the memory cell array in response to the command signal and the address signal;
a redundancy code generator configured to generate a second redundancy code by using the second data; and
a serializer configured to generate a second serialized data by serializing the second data and the second redundancy code.

12. The memory system of claim 11, wherein each of the semiconductor memory devices further includes a status register configured to store the status signal received from the redundancy code checker.

13. The memory system of claim 11, wherein the memory controller checks the status signal and detects a malfunctioning channel.

14. A computer system comprising:
a central processing unit (CPU);
a system controller coupled with the CPU, and including an input port and an output port;
an input device coupled with the CPU through the system controller;
an output device coupled with the CPU through the system controller;
a data storage device coupled with the CPU through the system controller; and
a plurality of semiconductor memory devices coupled with the system controller, wherein each of the semiconductor memory devices is coupled with each other through a daisy chain, and is configured to generate and check a redundancy code.

15. The computer system of claim 14, wherein each of the semiconductor memory devices comprises:
a memory cell array;
a deserializer configured to generate a deserialized data by deserializing a first serialized data;
a decoder configured to generate a first data, a command signal, an address signal and a first redundancy code by decoding the deserialized data;
a redundancy code checker configured to generate a status signal by comparing the first data with the first redundancy code to detect an error in the first data;
a control circuit configured to store the first data in the memory cell array or output a second data stored in the memory cell array in response to the command signal and the address signal;
a redundancy code generator configured to generate a second redundancy code by using the second data; and
a serializer configured to generate a second serialized data by serializing the second data and the second redundancy code.

16. The computer system of claim 15, wherein each of the semiconductor memory devices further includes a status register configured to store the status signal received from the redundancy code checker.

17. The computer system of claim 15, wherein the system controller checks the status signal and detects a malfunctioning channel.

18. A method of detecting an error of a memory system, the memory system including a memory controller and semiconductor memory devices coupled with the memory controller, the method comprising:

generating a deserialized data by deserializing a first serialized data in the respective semiconductor memory devices;

generating a first data, a command signal, an address signal and a first redundancy code by decoding the deserialized data;

generating a status signal by comparing the first data with the first redundancy code to detect an error in the first data; and detecting a malfunctioning channel by checking the status signal at the memory controller.

19. The method of claim 18, further comprising:

storing the first data in a memory cell array of the respective semiconductor memory devices in response to the command signal and the address signal;

outputting a second data that is stored in the memory cell array in response to the command signal and the address signal;

generating a second redundancy code by using the second data; and generating a second serialized data by serializing the second data and the second redundancy code.

* * * * *